United States Patent [19]

Gray et al.

[11] 4,208,076

[45] Jun. 17, 1980

[54] COMPLIANT HYDRODYNAMIC BEARING WITH IMPROVED SUPPORT ELEMENT

[75] Inventors: Stanley Gray, Skaneateles; John A. McCormick, Ballston Lake, both of N.Y.

[73] Assignee: Mechanical Technology Incorporated, Latham, N.Y.

[21] Appl. No.: 974,255

[22] Filed: Dec. 29, 1978

[51] Int. Cl.² ............................................. F16C 32/06
[52] U.S. Cl. .......................................... 308/9; 308/26; 308/73; 308/160
[58] Field of Search ................... 308/9, 26, 73, 160, 308/15, 237 R, 238, 163; 267/137

[56] References Cited

U.S. PATENT DOCUMENTS

| | | | |
|---|---|---|---|
| 3,382,014 | 5/1968 | Marley | 308/73 |
| 3,424,505 | 1/1969 | Pizzitola | 308/160 |
| 3,495,886 | 2/1970 | Roberts et al. | 308/160 |
| 4,082,375 | 4/1978 | Fortmann | 308/160 |

*Primary Examiner*—Lenard A. Footland
*Attorney, Agent, or Firm*—Joseph V. Claeys; John M. Neary

[57] ABSTRACT

A compliant, hydrodynamic fluid film bearing for supporting a rotating rotor on a stationary mount, includes a bearing sheet supported by a compliant resilient support member formed of two sheets, each having raised resilient elevations in the form of corrugations. One of these sheets is inverted with respect to the other and the corrugations on the two sheets are vertically aligned and face in opposite directions, each corrugation forming one-half of an elongated tubular spring. A metal sheet lies between the two support sheets and all three sheets, and the bearing sheet, are fastened at one end to a pair of spacer blocks. The yield strength of the support member is thus raised above the yield strength of a single support sheet while maintaining low stiffness.

15 Claims, 7 Drawing Figures

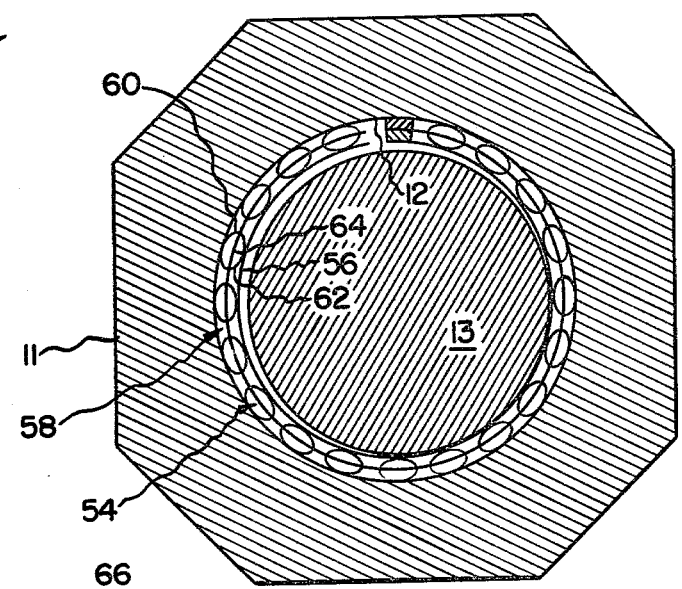
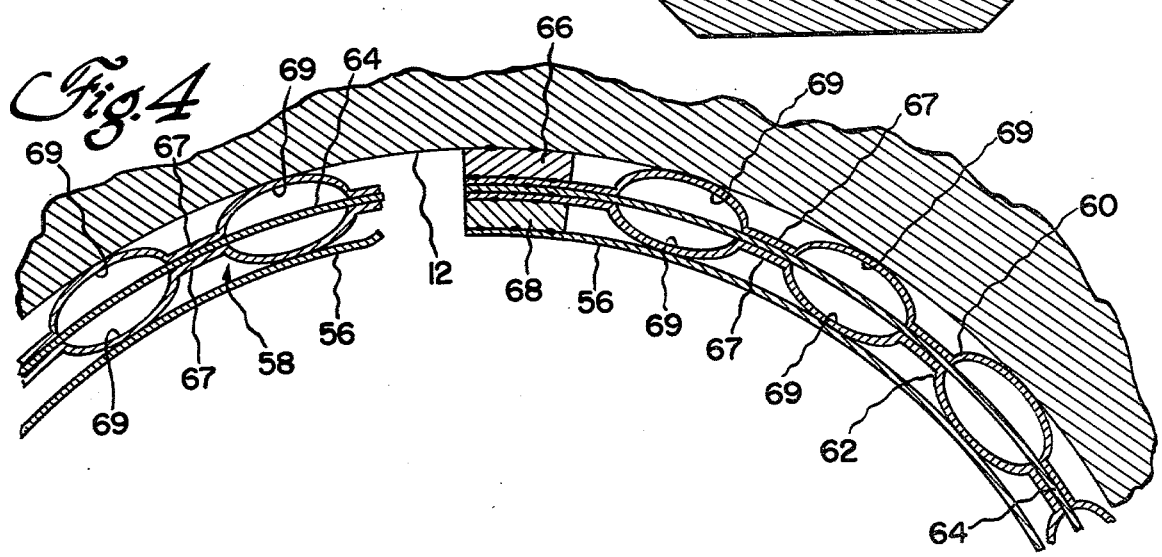
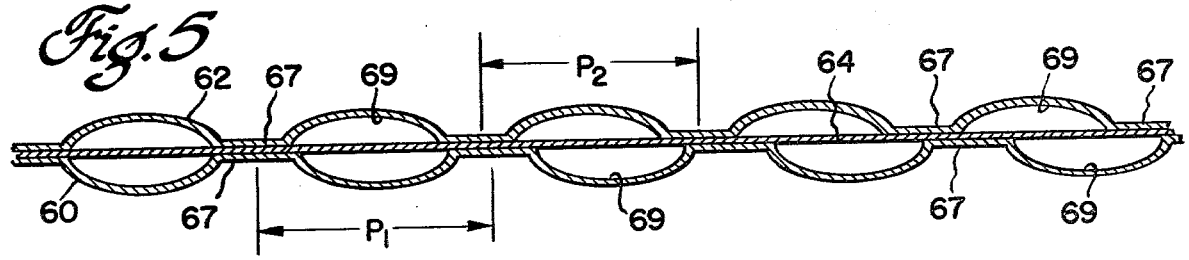
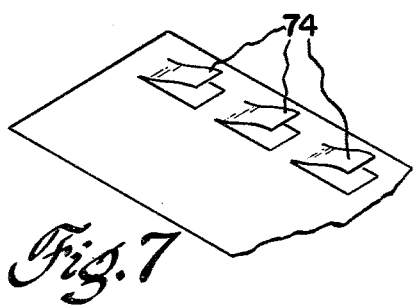
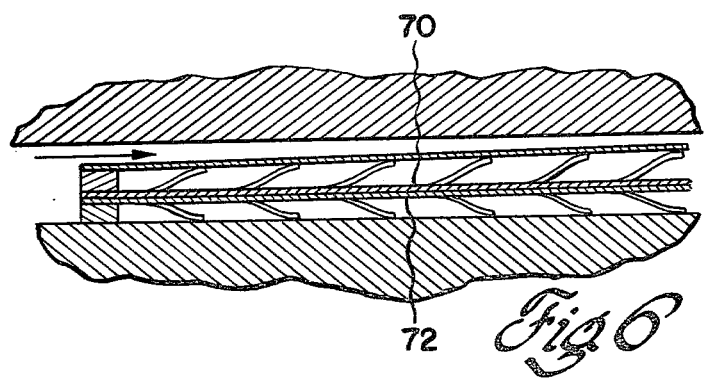

COMPLIANT HYDRODYNAMIC BEARING WITH IMPROVED SUPPORT ELEMENT

BACKGROUND OF THE INVENTION

This invention relates to compliant hydrodynamic fluid film bearings, and more particularly to an improved compliant support element for a bearing of this type.

A compliant hydrodynamic fluid film bearing is a thin, lightweight, inexpensive structure that supports extremely high speed rotors on a fluid film with small frictional losses, good damping characteristics, excellent durability and reliability. It includes a thin, flexible bearing sheet supported on a compliant support element which, in turn, is supported on a stationary mounting member such as a bearing sleeve or a thrust plate.

The hydrodynamic fluid film which supports the rotor on, and separates it from, the bearing sheet is created by the viscous or shear forces acting in the fluid parallel to the direction of relative movement between the rotating rotor bearing surface and the bearing surface of the bearing sheet. A rotating thrust runner, for example, drags the boundary layer of fluid with it as it rotates over the bearing sheet. The boundary layer, in turn, drags in the layer of fluid immediately adjacent and in this way a velocity gradient is established in the fluid in the gap between the thrust runner and the bearing sheet. This gap is wedge-shaped, tapering in the direction of movement of the rotating rotor. The wedge-shaped gap is inherent in the journal bearing and is created in the case of the thrust bearing by various techniques. The pressure of the fluid drawn into the wedge-shaped gap tends to increase toward the narrow end of the gap, thus creating the pressurized cushion or fluid film which dynamically supports the rotating rotor.

The compliant support element for the flexible bearing sheet enables it to conform to the bearing surface of the rotating rotor despite thermal distortion and centrigual growth, and despite rotor run-out due to eccentric loads or rotor unbalance. In prior art rigid hydrodynamic fluid bearings, these effects can interfere with the conformance of the stationary bearing surface with the bearing surface of the rotating rotor and thereby adversely affect the hydrodynamic action by which the supporting fluid film is generated. The compliant support element in compliant hydrodynamic bearings can deflect and expand to support the bearing sheet in correct hydrodynamic relationship to the rotating rotor despite these deviations of the rotor bearing surface from its normal plane of operation. The pressurized fluid cushion or film on which the rotor is supported obviates the need for rolling element bearings, and the self-pressurizing nature of this bearing frees it from dependence on external pressurizing equipment needed in hydrostatic bearings. Thus, this bearing offers the potential advantages of a virtually limitless speed ceiling, a miniscule wear rate, and long reliable operation.

Because of these advantages, the compliant hydrodynamic fluid bearing has attracted a great deal of attention in the recent past for extremely high rotational speed applications. In addition, when the lubricating fluid used in these bearings is a gas such as air or helium, the temperature limitations imposed upon conventional bearings by reason of the coking temperature of oil or other liquid lubricants does not apply and the temperature limitation then becomes that of the metal elements in the bearing. These and other properties make these bearings extremely attractive for applications such as turbomachinery, high speed industrial applications, and certain consumer products.

There is one limitation, however, which has in the past restricted the use of these bearings to fewer fields than their potential application. The relatively low yield strength of the thin and flexible materials used in these bearings to achieve the desired compliance have imposed a limited load carrying capacity. The performance characteristics of these bearings, well known to experts in the field of high speed rotating machinery, have inspired continuous research to discover ways to increase the load carrying capacity of these bearings in order to apply them to higher load applications. These approaches have generally involved increasing the gauge of the bearing materials or adding other stiffening or strengthening members. These expedients have produced an increase in load carrying capacity but, have usually been accompanied by other undesirable effects such as a decrease in compliance and therefore a decrease in the tolerance of the bearing to misalignment and transient rotor excursions referred to above.

SUMMARY OF THE INVENTION

Accordingly, it is an object of this invention to provide a compliant hydrodynamic fluid bearing having improved load bearing capacity without imparing the ability of the bearing to conform to the bearing surface of a misaligned rotor, and which produces only small reaction forces when an imperfectly balanced rotor passes through critical speeds.

These and other objects of the invention are achieved by the disclosed preferred embodiments of the invention wherein the compliant support element for the bearing is formed of two support sheets having raised resilient projections. The projections of the two sheets are vertically aligned with each other or separated by a flexible separator sheet, and one support sheet is inverted with respect to the other so that the projections extend in opposite directions. In this configuration, the two support sheets act as two springs in series to offer a higher degree of compliance than either individual sheet acting alone could offer. To achieve this degree of compliance with a single sheet would require the use of thinner gauge materials which might not be able to support the required load without becoming overstressed. The series stack enables the use of heavier gauge bearing materials which can withstand the stress of the higher load exerted on the bearing without producing a stiffness which would give undesirable large reaction forces and prevent the degree of conformance with the rotor bearing surface necessary to maintain the hydrodynamic effect without loss of load carrying capacity in misalignment situations.

DESCRIPTION OF THE DRAWINGS

The invention and its many attendant objects and advantages will become more apparent upon reading the following detailed description of the preferred embodiment in conjunction with an examination of the following drawings wherein:

FIG. 3 is an enlarged sectional elevation of the journal bearing shown in FIG. 1;

FIG. 4 is an enlarged view of the two end portions of the journal bearing insert shown in FIG. 4;

FIG. 5 is a developed view of the bearing insert shown in FIGS. 3 and 4, before insertion into the journal bearing sleeve;

FIG. 6 is a sectional elevation of a thrust bearing using a modified form of support element; and FIG. 7 is a perspective view of one of the support members of the support element shown in FIG. 6.

DESCRIPTION OF THE PREFERRED EMBODIMENTS

Figure 1:
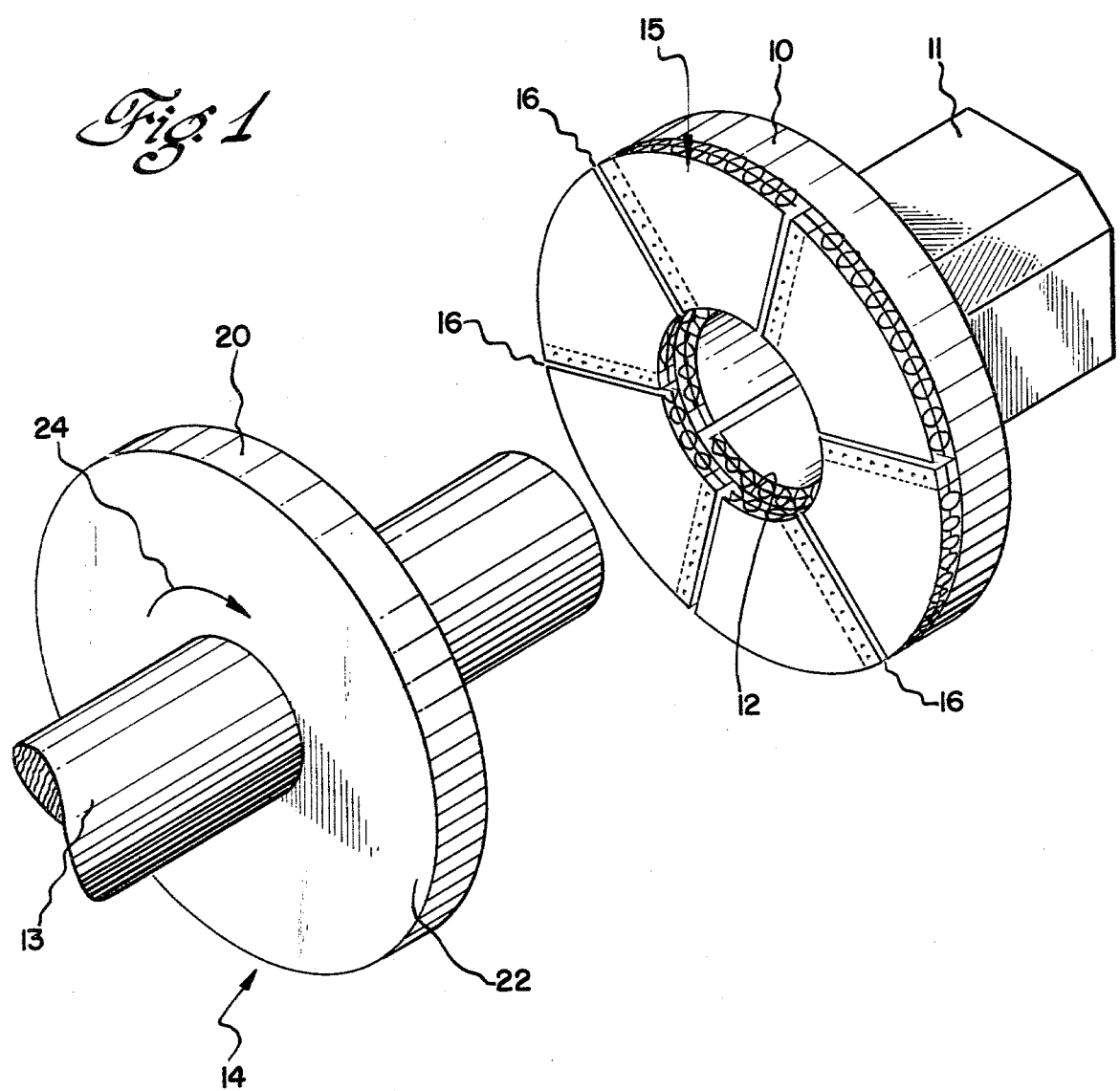
FIG. 1 is a perspective view of a thrust and journal bearing cartridge made in accordance with this invention.

Referring now to the drawings wherein like reference characters designate identical or corresponding parts, and more particularly to FIG. 1 thereof, a combined thrust and journal bearing is shown having a thrust plate 10 mounted on one end of a journal sleeve 11. An axial bore 12 extends through the thrust plate 10 and journal sleeve 11 and receives the rotor shaft 13 of the rotor assembly 14 shown removed from the bearing housing.

Six identical pad modules or assemblies 15 are mounted on, and spaced equally around the thrust plate 10. Although six pad assemblies 15 are shown, other numbers may be used, depending on the size of the thrust plate 10, with more pads being used on a larger diameter thrust plate and fewer pads being used on a smaller diameter thrust plate. A narrow space 16 is maintained between the pad assemblies 15 for ease of fabrication and repair, and also as an inlet ramp for the hydrodynamic fluid wedge and as a channel for cooling fluid.

Figure 2:
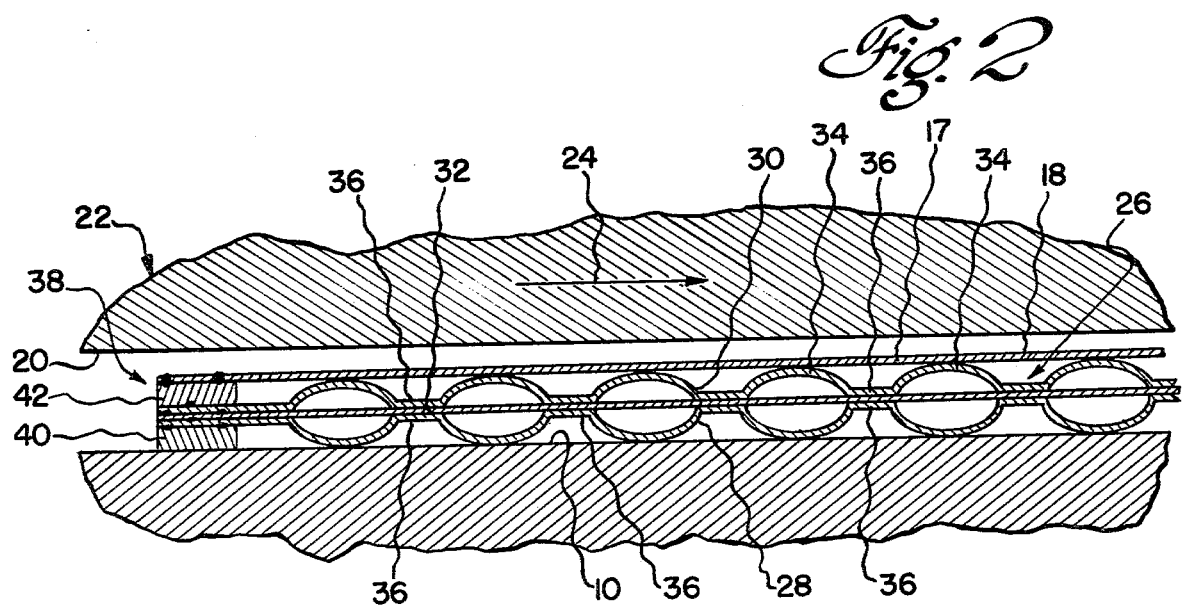
FIG. 2 is an elevation of the edge of the thrust bearing pads shown in FIG. 1.

Referring now to FIG. 2, each pad 15 includes a bearing sheet 17 having an upwardly facing bearing surface 18. The bearing surface 18 faces an opposing bearing surface 20 of a thrust runner 22 which is rotating relative to the thrust plate 10 and its bearing pad assemblies 15 in the direction indicated by the arrow 24.

The bearing sheet 17 in each pad assembly 15 is supported by a resilient, compliant support element 26. The support element 26 supports the bearing sheet 17 in bearing relationship to the opposing surface 20 of the thrust runner 22 while permitting the bearing sheet 17 to deflect and conform to the opposing bearing surface 20 when the thrust runner 22 experiences transient excursions out of its normal operating plane parallel to the thrust plate 10.

The support element 26 includes a first support member 28, a second support member 30, and an intervening sheet 32. Each of the support elements 28 and 30 is formed of thin, flexible spring metal and includes a regular series of elevations 34 separated by flat land portions 36. The elevations 34 on the two sheets 28 and 30 are vertically aligned and inverted with respect to each other on the two members so that the elevations 34 project in opposite directions and the flat land portions 36 on the two members are adjacent. In this way, the elevations 34 form a parallel array of series spring pairs, and the forces exerted by the sheet 17 upon the top member 30 are transmitted through the intervening sheet 32 directly to the land portions 36 on the first support member 28 and thence to the thrust plate 10. This arrangement ensures that the stress in both support members will be equal and they will deflect equally to maintain the aligned relationship.

The bearing sheet 17, the two support elements 28 and 30, and the intervening sheet 32 are all fastened together along one radially extending edge, which is the leading edge 38 with respect to the rotation of the thrust runner 22. To provide a secure fastening of the bearing elements to the thrust plate 10, and to provide a leading edge which is free of distortion and is the optimum height for the initiation of a hydrodynamic fluid wedge, a pair of spacer blocks 40 and 42 are used to space the leading edge portions of the bearing elements above the surface of the thrust plate 10 and to hold them in correct relationship to each other. The first spacer block 40 is welded to the thrust plate 10 by spot welding or resistance seam welding, and the aligned and juxtaposed edges of the leading edge of the two support members 28 and 30 and the intervening sheet 32 are welded to the spacer block 40 with the leading edge of the support members 28 and 30 on either side of the leading edge of the intervening sheet 32. A second spacer block 42 is welded to the welded edge of the two support members and the spacer block 40 and the leading edge of the bearing sheet 17 is welded to the top of the spacer block 42.

The function of the intervening sheet 32 is twofold. Its first function is to insure that the land portions of the two support members 28 and 30 do not slip past one another in the event of a slight misalignment or momentary non-uniform deflection of the two support elements. If the land portions of the two support members slipped past one another, the bearing sheet 16 would lie slightly lower than its leading edge portion which would be the wrong slope for the bearing sheet. In addition, if the "springs" of the corrugations or elevations 34 were nested instead of in series, the stiffness of the resulting structure would be excessive.

The other function of the intervening sheet 32 is to facilitate coulomb damping which occurs when the support members 28 and 30 flex and expand, thereby scrubbing their land portions 36 against the opposite sides of the intervening sheet 32. The frictional losses inherent in the scrubbing action tend to absorb the energy of undesirable bearing effects such as self-speed whirl, thereby increasing the bearing stability.

The spacer block 40 raises the level of the leading edge of the intervening sheet 32 to the plane defined by the top surface of the land portions 36 of the first support member 28. The second spacer block 42 raises the level of the bearing sheet 17 to the plane defined by the crests of the elevations 34 on the second support member 30. In this way, it is unnecessary to bend the intervening sheet 32 or the bearing sheet 17 and each member of the pad assembly 15 lies flat and level on its allotted position without distortion and with such ease of assembly.

As shown in FIG. 2, it may be desirable to arrange the elevations 34 of the two support members 28 and 30 in gradually increasing height. In this way, the support element 26 supports the bearing sheet 17 so that it slopes upwardly away from the leading edge 38. The upward slope facilitates the generation of a hydrodynamic supporting fluid film cushion or film between the bearing sheet 17 and the opposing bearing surface 20 of the rotating thrust runner 22.

The two support members 28 and 30 are mirror images in design and dimensions and identical in physical characteristics such as stiffness, spring constant, coefficient of thermal expansion, etc. Thus, when the support members flex under load, they each flex in the same way so that the elevations and land portions remain vertically aligned. In practice, this is achieved by making the two support members 28 and 30 mirror images, that is, made from the same material blanks oriented 180° apart in the same or identical dies. Likewise, the intervening sheet 32 can be identical to the bearing sheet 17, and the two spacer blocks 40 and 42 can be identical. This arrangement facilitates the fabrication and assembly process and presents a very simple inventory situation.

When the bearing is used in high temperature applications and uses a gas as a lubricant, the surface 18 of the bearing sheet 17 is preferably coated with a dry, high temperature coating such as "HL-800", a proprietary coating of Mechanical Technology Incorporated of Latham, New York and disclosed in a copending application of Bharat Bhushan Serial No. (File No. 2-D-443) the disclosure of which is hereby incorporated by reference.

Turning now to FIG. 3, the journal bearing of the bearing shown in FIG. 1 is shown having bearing insert 54 lining the bore 2 for dynamically supporting the rotating shaft 13. The bearing insert 54 includes a bearing sheet 56 compliantly supported by a support element 58 so that the bearing sheet 56 can conform to the shape of the rotating shaft 13 and assume the optimum shape for the generation of a high pressure, large area hydrodynamic supporting fluid film.

The theory and mode of operation of this bearing is based on the action of the rotating shaft carrying the lubricant into, and pressurizing it in, the wedge shaped cup which lies between the shaft 55 and the bearing sheet 56. This wedge shaped gap is shown, great exaggerated for purposes of illustration, in FIG. 3. The conformance of the bearing sheet 56 to the shape of the rotating shaft 13 makes the wedge shaped space between the shaft and the bearing sheet 56 much wider and more gradual than a rigid bore of the same diameter would be, and therefore increases the area of the interface between the shaft and the bearing sheet in which a hydrodynamic supporting fluid film pressure can be generated and exist. In addition, because the effective area supporting the shaft load is greater in a compliant bearing, the pressure of the load is less and therefore the total load capacity can be greater. Finally, the compliance of the support element enables the bearing sheet to deflect in the event of transient excursions of the shaft 13 from its normal axis of rotation which can occur during high speed operation of an unbalanced shaft, under operation with eccentric applied loads, or with a misaligned shaft or bearing. Under these effects, the compliant support element 58 will deflect and enable the bearing sheet 56 to conform to the bearing surface of the shaft 55 despite its deviations from its intended axis of rotation.

The supporting element 58, best shown in FIG. 4, includes a first support member 60, a second support member 62, and an intervening sheet 64 positioned between the two support members. Both support members 60 and 62 and the intervening sheet 64 are fastened to a spacer block 66 at one end of the assembly, and a second spacer block 68 is fastened on top of the end of the second support member 62. The first spacer block 66 is welded to the bore 52 of the bearing sleeve 50 by spot welding or resistance seam welding and the other members of the bearing insert are welded, in turn, atop each other as shown in FIG. 4. Finally, the bearing sheet 56 is similarly welded to the top of the second spacer block 68. The two support members each include a regular array of raised resilient elevations in the form of corrugations 69 separated by flat land portions 67. The elevations 69 and the flat land portions 67 are radially aligned so that forces exerted on the supporting element 58 from the bearing sheet 56 during operation are transmitted directly through the flat land portions 67 from one member to the other, and the elevations act as springs in series. Because the radius of the second support member 62 is less than the radius of the first support member 60, its circumference is less and the pitch of the elevations must be less than the pitch of the elevations on the first support member 60 so that the elevations and the land portions are radially aligned when the bearing is in place in the bore 52.

A modification of the support elements 28, 30, 60, and 62 is shown in FIGS. 6 and 7. The support elements 70 and 72 are formed of thin sheet metal of the same material used in the embodiments of FIGS. 1 and 2 and FIGS. 3-5. Instead of the bump form or corrugation elevations used in the support elements of the first two embodiments however, the embodiment of FIGS. 6 and 7 employs leaf-like projections which are formed by cutting or shearing the material in a U-shaped cut and bending the material within the U-shaped cut out of the plane of the material. Because of the relatively wide area of engagement of the two sheets 70 and 72 and because the leaf projections 74 do not cause movement of the sheet when the leaf projections deflect, there is no need for an intervening sheet such as sheet 32 and sheet 64 in the first two embodiments.

Obviously, numerous other modifications and variations are possible in light of the above disclosure.

It is therefore expressly to be understood that these and other modifications and variations may be practiced while remaining within the spirit and scope of the invention defined by the following claims, wherein we claim:

1. A compliant, hydrodynamic fluid film bearing for dynamically supporting a high speed rotating rotor in a mount, comprising at least one bearing module including:
   a flat, flexible bearing sheet having a bearing surface facing a corresponding bearing surface on the rotor;
   a compliant supporting element lying between said bearing sheet and said mount for resiliently supporting said bearing sheet;
   said element including two support sheets, each having a pattern of raised resilient projections formed thereon, said projections on one of said support sheets being in series with the projections on the other support sheet, so that the support sheet can be made of heavy gauge material having a high load capacity and low overall stiffness.

2. The bearing defined in claim 1, further comprising:
   a spacer block interposed between and fastened to one edge of said bearing sheet and said supporting element for raising the elevation of said bearing sheet; and
   a flat middle sheet interposed between said two support sheets and fastened at one end to said spacer block;
   whereby said support sheets will move slightly in operation with respect to said middle sheet, said mount and said bearing sheet, and thereby generate coulomb damping to stabilize said bearing.

3. The bearing defined in claim 2, wherein said projections on said support sheets are in the form of corrugations having an axis of elongation and separated by flat land portions; and said one edge of said support element is formed by a pair of vertically aligned flat edge land portions of said support sheets, to which said spacer block is fastened.

4. The bearing defined in claim 3, further comprising a second spacer block interposed between, and fastened to, said supporting element and the stationary mount;
said middle sheet lying between and fastened to said edge land portions of said support sheets.

5. The bearing defined in claim 1, in which the bearing is a thrust bearing, the stationary mount is a thrust plate, the rotating rotor is a thrust runner and a plurality of bearing modules are connected to said thrust plate at angularly spaced positions therearound, wherein for each of said modules:
said bearing sheet and said support element are fastened together and to said thrust plate at one edge, said one edge being the leading edge with respect to the rotation of the thrust runner; and
a middle sheet is interposed between said two support sheets and fastened thereto at said leading edge.

6. The bearing defined in claim 5, wherein;
the pitch of said projections is the same on each of said two support sheets, and the amplitude of said projections increases from the projection adjacent said leading edge toward the projections adjacent the angularly remote edge of said bearing sheet, which is the trailing edge.

7. The bearing defined in claim 5, wherein;
a spacer block is interposed and fastened to said bearing sheet and said thrust plate at said leading edge for raising the elevation of the leading edge of said bearing sheet.

8. The bearing defined in claim 1, wherein said bearing is a journal bearing, said mount is a journal sleeve having an axial bore, and said two support sheets include an inside sheet and an outside sheet, said projections on said sheet having a regular period, and said projections on said outside sheet having a regular period, said inside sheet projection period being shorter than said outside sheet projection period.

9. The bearing defined in claim 8, further comprising:
a flat middle sheet interposed between said two support sheets, said projection crests on both of said support sheets being separated by intervening flat land portions, said flat land portions on both support sheets being in contact with said middle sheet.

10. The bearing defined in claim 9, further comprising:
two spacer blocks, one of which is fastened to the wall of said axial bore;
one edge of said two support sheets and said middle sheet being fastened to and between said spacer blocks; and
said bearing sheet being fastened to the side of the other spacer block remote from the side to which said support and middle sheets are attached.

11. A compliant hydrodynamic fluid film bearing, comprising:
a stationary cartridge having a journal bearing sleeve and an integral thrust plate, said cartridge having means defining cylindrical axial bore extending therein and opening in said thrust plate, said thrust plate having an axially facing thrust surface;
a journal bearing assembly disposed in said bore and including a smooth, flexible bearing sheet and, supporting said sheet, a resilient, compliant supporting element having two support sheets, each with an array of spaced resilient elevations radially aligned with the elevations on the other support sheet;
a thrust bearing assembly disposed on said thrust plate and including a plurality of pad assemblies, fastened to said thrust plate at angularly spaced positions around said thrust plate;
each of said thrust pad assemblies including a smooth, flexible bearing sheet and, supporting said sheet, a resilient compliant supporting element having two support sheets, each with an array of spaced resilient elevations radially aligned with the elevations on the other support sheet;
whereby said thrust and journal bearing assemblies can support heavy axial and radial loads with minimal stiffness of said bearing elements, so that skew loads which cause the rotor to deflect angularly from its normal axis of rotation and cause non-uniform deflection of one support element will cause a similar non-uniform deflection in the other support element that will enable the bearing to support the load over a wide bearing area with a pressure that is within the pressure limit of the lubricating fluid film.

12. A resilient, compliant support element supporting a bearing sheet in a compliant, hydrodynamic fluid film bearing, comprising:
two support sheets, each having a regular array of raised resilient elevations projecting above the plane of said sheet, said array being spaced along said sheet such that said elevations on one of said sheets are aligned with said elevations on the other of said sheets thereby to form a parallel array of spring pairs in series.

13. The support element defined in claim 12, further comprising:
a spacer block interposed between and fastened to one edge of said bearing sheet and said supporting element for raising the elevation of said bearing sheet; and
a flat middle sheet interposed between said two support sheets and fastened at one end to said spacer block;
whereby said support sheets will move slightly in operation with respect to said middle sheet and thereby generate coulomb damping to stabilize said bearing.

14. The support element defined in claim 13, wherein:
said projections on said support sheets are in the form of corrugations having an axis of elongation and separated by flat land portions;
said one edge of said support element being formed by a pair of vertically aligned flat edge land portions of said support sheets, to which said spacer block is fastened;

15. The support element defined in claim 12, wherein:
the pitch of said projections is the same on each of said two support sheets, said pitch and the amplitude of said projections increasing from the projection adjacent said leading edge toward the projection adjacent the angularly remote edge of said bearing sheet, which is the trailing edge.

* * * * *

UNITED STATES PATENT AND TRADEMARK OFFICE
CERTIFICATE OF CORRECTION

PATENT NO. : 4,208,076
DATED : June 17, 1980
INVENTOR(S) : Stanley Gray and John McCormick It is certified that error appears in the above-identified patent and that said Letters Patent are hereby corrected as shown below:

Column 1, lines 40 and 41, "centrigual" should be --centrifugal--
Column 4, lines 13 and 14, "resistence" should be --resistance--
          line 42, "self-speed" should be --half-speed--
          line 53, "such" should be --much--
Column 5, line 31, "cup" should be --gap--
          line 64, "resistence" should be --resistance--
Column 6, line 33, paragraph indentation should be omitted and line 33 should start right after last word in line 32, blending two paragraphs into one.
Column 7, line 25, ";" should be --:--
          line 32, ";" should be --:--
          line 41, --inside-- should be inserted between "said" and "sheet"
Column 8, line 59, ";" should be --:--.

Signed and Sealed this

Fourteenth Day of October 1980

[SEAL]

Attest:

SIDNEY A. DIAMOND

Attesting Officer

Commissioner of Patents and Trademark